United States Patent
Koizumi

[11] 3,720,466
[45] March 13, 1973

[54] SLIT EXPOSURE OPTICAL SYSTEM FOR REPRODUCING APPARATUS OR THE LIKE

[75] Inventor: Yutaka Koizumi, Kohoku-ku, Yokohama-shi, Kanagawa-ken, Japan

[73] Assignee: Kabushiki Kaisha Ricoh, Tokyo, Japan

[22] Filed: April 30, 1970

[21] Appl. No.: 33,290

[30] Foreign Application Priority Data

May 16, 1969 Japan ........................... 44/45773

[52] U.S. Cl. ................................................. 355/8
[51] Int. Cl. ............................................. G03g 15/04
[58] Field of Search ................................... 355/8, 66

[56] References Cited

UNITED STATES PATENTS

| | | | |
|---|---|---|---|
| 3,497,298 | 2/1970 | Watanabe | 355/66 X |
| 3,543,290 | 11/1970 | Koizumi | 355/66 X |
| 3,614,222 | 10/1971 | Post et al. | 355/66 X |
| 3,609,024 | 9/1971 | Suzuki | 355/51 |
| 3,330,181 | 7/1967 | Jakobson | 355/66 X |

*Primary Examiner*—Samuel S. Matthews
*Assistant Examiner*—Kenneth C. Hutchison
*Attorney*—Craig, Antonelli, Stewart & Hill

[57] ABSTRACT

A slit exposure optical system for use in a reproducing apparatus having a fixed projection lens for projecting a scanned image of the object on a photoreceptor and a mirror arrangement for scanning the object including only two movable mirrors disposed between the projection lens and the object. The first movable mirror is disposed transversely to the optical axis of the projection lens and the plane of the object and the second movable mirror is disposed to face the first movable mirror and the object and is moved at twice the speed of the first movable mirror.

5 Claims, 4 Drawing Figures

INVENTOR
YUTAKA KOIZUMI
BY
Craig, Antonelli, Stewart & Hill
ATTORNEYS

INVENTOR
YUTAKA KOIZUMI
BY Craig, Antonelli, Stewart & Hill
ATTORNEYS

SLIT EXPOSURE OPTICAL SYSTEM FOR REPRODUCING APPARATUS OR THE LIKE

The present invention relates to an exposure optical system for reproducing apparatus or the like wherein an object such as an original is fixed while mirrors and a photoreceptor are moved relatively at constant speeds in order to effect slit exposure. The exposure optical system is characterized by a simple structure in which only two mirrors need to be moved and by the attainment of an excellent focusing.

Figure 1:
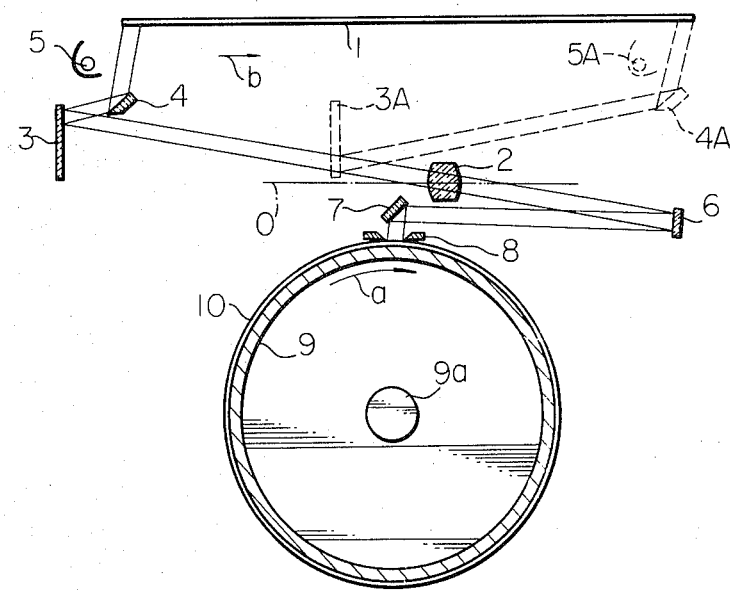
Figure 2:
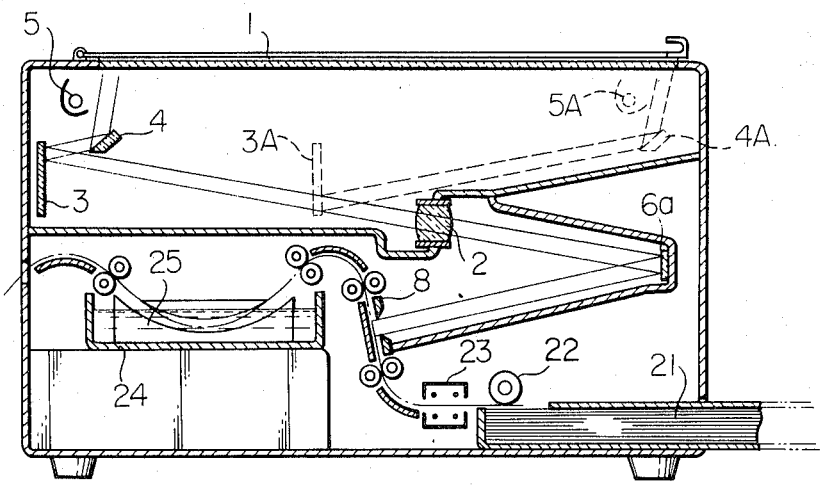
Figure 3:
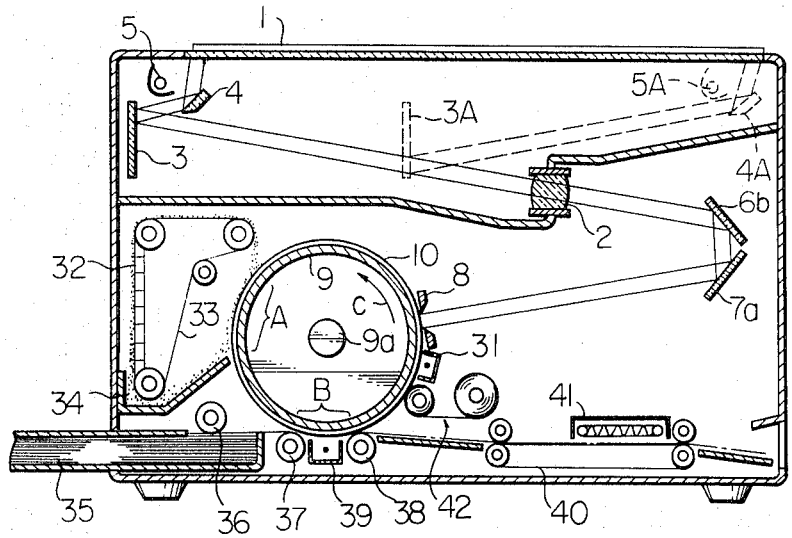
Figure 4:
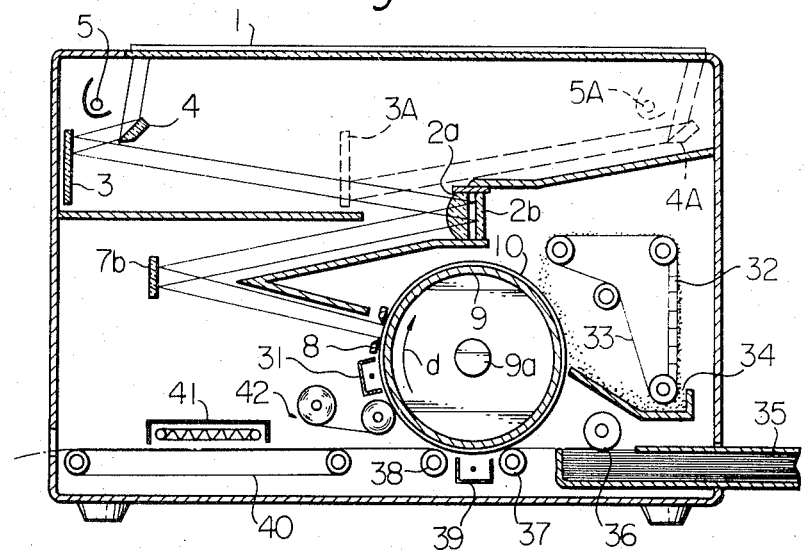

For a better understanding of the invention as well as other objects and further features thereof, reference is made to the following description of the invention taken in conjunction with the accompanying drawings wherein:

FIG. 1 denotes a vertical sectional view of a slit exposure optical system mounted in a reproducing apparatus, which illustrates an embodiment of the present invention; and FIGS. 2 to 4 denote vertical sectional views of different electrophotographic reproducing apparatuses, each of which utilizes a slit exposure optical system of the present invention.

In FIG. 1, an object 1 such as an original is fixed, a projection lens 2 is positioned so that its optical axis 0 may be parallel to said object 1, a first movable mirror 3 is mounted in the optical path so as to be perpendicular to said optical axis 0, a second movable mirror 4 is mounted so as to be inclined at 45° to said optical axis 0 and so that its reflection surface faces said object 1 said first mirror 3, a cylindrical light source 5 is formed integral with said second movable mirror 4, a first fixed mirror 6 is mounted on the opposite side of said lens 2 from the mirror 3, a second fixed mirror 7 is mounted at the level of said first fixed mirror 6, and a slit member 8 is mounted adjacent said second fixed mirror 7. Right under said slit member 8, a photosensitive layer 10 made of a photoconductive material is mounted on the peripheral surface of a rotary drum 9 and is moved in the direction shown by an arrow $a$ at a constant speed in accordance with the rotation of said drum 9. A reference number 9a denotes a rotary shaft of said drum 9. In the condition shown by full lines, the length of the optical path from said lens 2 to said object 1 is set equal to that from said lens 2 to the portion of said photosensitive layer 10 just under the slit. Said second movable mirror 4 is moved in the direction shown by an arrow $b$ parallel to the optical axis 0 at a speed corresponding to the peripheral rate of said photosensitive layer 10, while said first movable mirror 3 is moved in the same direction as said second movable mirror 4 at a half speed of that of said second movable mirror 4. Therefore, the lengths of both of said optical paths in either direction from the lens 2 will always be kept equal even if both of said movable mirrors 3 and 4 are moved. Said second movable mirror 4 is moved from the position shown by a full line to a position 4A shown by a broken line together with said energized light source 5 and said object 1 is scanned, while said first movable mirror 3 is moved from the position shown in full line to a position 3A shown by a broken line. Accordingly, said lens 2 serves to project and focus the image of said scanned object 1 onto said photosensitive layer 10 which is moved synchronously with the scanning.

As is stated above, the slit exposure optical system of the present invention is very simple in structure. The lens 2 is fixed while only two mirrors 3 and 4 are movable; their moving directions are the same, so that an image is exposed with good focus and the reproducing apparatus can be made small and rather efficient.

The following are three examples of an electrophotographic reproducing apparatus using the slit exposure optical system of the present invention. The elements shown in FIGS. 2 to 4 and designated by the same reference numbers as in FIG. 1 are the same as those shown in FIG. 1 in structure and function.

In FIG. 2, sheets of photosensitive paper 21 are fed out one by one by a roller 22, are charged by corona discharge of a charging means 23 and are advanced beneath the slit member 8. Reflected light from the image of the object 1 scanned through cooperation of the second movable mirror 4 and the first movable mirror 3 is projected onto the lens 2, so as to be focused onto the fixed mirror 6a, which reflects it onto a sheet of photosensitive paper 21 in order to expose the sheet. Said photosensitive paper 21 on which an electrostatic latent image has been formed by said exposure is forwarded, and is immersed in a developer liquid 25 in a tank 24, whereby said electrostatic latent image is made visible by toner particles attaching thereto.

In FIG. 3, fixed mirrors 6b and 7a are mounted at an angle to each other facing the lens 2. The image of the object 1 is scanned through cooperation of the second movable mirror 4 and the first movable mirror 3. The reflected light, after having been focused, is reflected by said fixed mirrors 6b and 7a, and is projected through the slit member 8 onto the photosensitive layer 10 on the rotary drum 9, which rotates in the direction shown by an arrow $c$. After said photosensitive layer 10 has been charged by a charging means 31, the image of the object 1 is projected onto said photosensitive layer 10 by the sequential scanning of the object, and an electrostatic latent image is formed thereon. The exposed photosensitive layer 10 is forwarded to a developing position A, where developer powder 34 carried up through cooperation of a magnetic plate 32 and non-magnetic belt 33 is caused to flow down to make said electrostatic latent image visible. The developed photosensitive layer 10 then proceeds to a transfer position B, where a sheet of transfer paper 35 fed by a roller 36 is brought into pressure contact with said photosensitive layer 10 by rollers 37 and 38 which are positioned into pressure contact with the drum 9, and is given a corona discharge by a charging means 39 from the backside so that a toner image is transferred onto said transfer paper 35. The transfer paper 35 having completed the transfer step is forwarded to a fixing position 41 by a belt 40, wherein the transferred image is fixed by the illumination of infrared rays. On the other hand, the photosensitive layer 10, after the transfer step, is rotated on to a cleaning position 42 wherein the residual toner particles are wiped off.

With reference to FIG. 4, a lens 2a having a mirror 2b made integral therewith at the back, that is, a mirror containing lens 2a, is used instead of said lens 2. The image of the object 1 is scanned through cooperation of the second movable mirror 4 and the first movable mirror 3. The reflected light is caused to focus and is reflected by said lens 2a, is projected through a fixed mirror 7b and the slit member 8 onto the photosensitive layer 10 which is rotated in the direction shown by an arrow d. After that, the steps of charging, developing, transfer, fixing and cleaning which are respectively the same as those described in connection with the embodiment of FIG. 3 are repeated. The elements shown in FIG. 4 and designated by the same reference numbers as FIG. 3 are the same as those shown in FIG. 3 in structure and function. Further, in the embodiments shown in FIGS. 2 to 4, rolled photosensitive paper or rolled transfer paper may be used instead of the cut sheets of photosensitive paper 21 or the cut sheets of transfer paper 35. Further, the electrophotographic reproducing apparatus using the slit exposure optical system of the present invention is not limited to those devices having the types and structures shown in FIGS. 2 to 3. Further, in the slit exposure optical system of the present invention, as is stated above, a mirror containing lens as shown in FIG. 4 may be used instead of a conventional lens, and the number of the fixed mirrors mounted at the back of the lens and the positions thereof may be selected properly in view of design.

What is claimed is:

1. A slit exposure optical system for a reproducing apparatus or the like which includes a photoreceptor for receiving a light image of an object to be reproduced, comprising a fixed projection lens, a first movable mirror mounted on an optical path of said lens and disposed transversely to the optical axis thereof, and a second movable mirror inclined to said first movable mirror and facing both said first movable mirror and an object receiving position, said second movable mirror being mounted for movement parallel to said optical axis at a speed corresponding to the moving speed of said photoreceptor, and means for moving said first movable mirror in the same direction as said second movable mirror at one half of the speed of said second movable mirror, so that the length of the optical path from said lens to said object is always kept equal with that from said lens to said photoreceptor.

2. A slit exposure optical system as defined in claim 1 wherein said first movable mirror is disposed transversely to the plane of the object to be reproduced.

3. A slit exposure optical system as defined in claim 2 wherein said first and second movable mirrors are positioned between said fixed projection lens and the object receiving position.

4. A slit exposure optical system as defined in claim 3 wherein said first and second movable mirrors are mounted for movement from a first position toward said fixed projection lens during the scanning of said object.

5. A slit exposure optical system as defined in claim 1 wherein said first and second movable mirrors are positioned between said fixed projection lens and the object receiving position.

* * * * *

UNITED STATES PATENT OFFICE
CERTIFICATE OF CORRECTION

Patent No. 3,720,466　　　　　　　　Dated March 13, 1973

Inventor(s) Yutaka Koizumi

It is certified that error appears in the above-identified patent and that said Letters Patent are hereby corrected as shown below:

Claim 1 has been printed without those amendments requested by applicant on February 7, 1972. The claim should read as follows:

--1. A slit exposure optical system for a reproducing apparatus or the like which includes a photoreceptor for receiving a light image of an object to be reproduced, comprising a fixed projection lens, a first movable mirror mounted in a plane disposed transversely to the optical axis of said lens and being offset from said axis so that the optical path thereof to said lens is inclined to the axis of said lens, and a second movable mirror inclined to said first movable mirror and facing both said first movable mirror and an object receiving position, said second movable mirror being mounted for movement parallel to said optical axis at a speed corresponding to the moving speed of said photoreceptor, and means for moving said first movable mirror in the same direction as said second movable mirror at one half of the speed of said second movable mirror, so that the length of the optical path from said lens to said object is always kept equal with that from said lens to said photoreceptor.--

Signed and sealed this 16th day of April 1974.

(SEAL)
Attest:

EDWARD M.FLETCHER,JR.　　　　　　　C. MARSHALL DANN
Attesting Officer　　　　　　　　　　Commissioner of Patents